April 30, 1968     W. M. LOWERRE, JR     3,380,374
LIQUID INFUSION DEVICE

Filed Aug. 24, 1966     4 Sheets-Sheet 1

INVENTOR
WILLIAM M. LOWERRE, JR.

BY Cushman, Darby & Cushman
ATTORNEYS

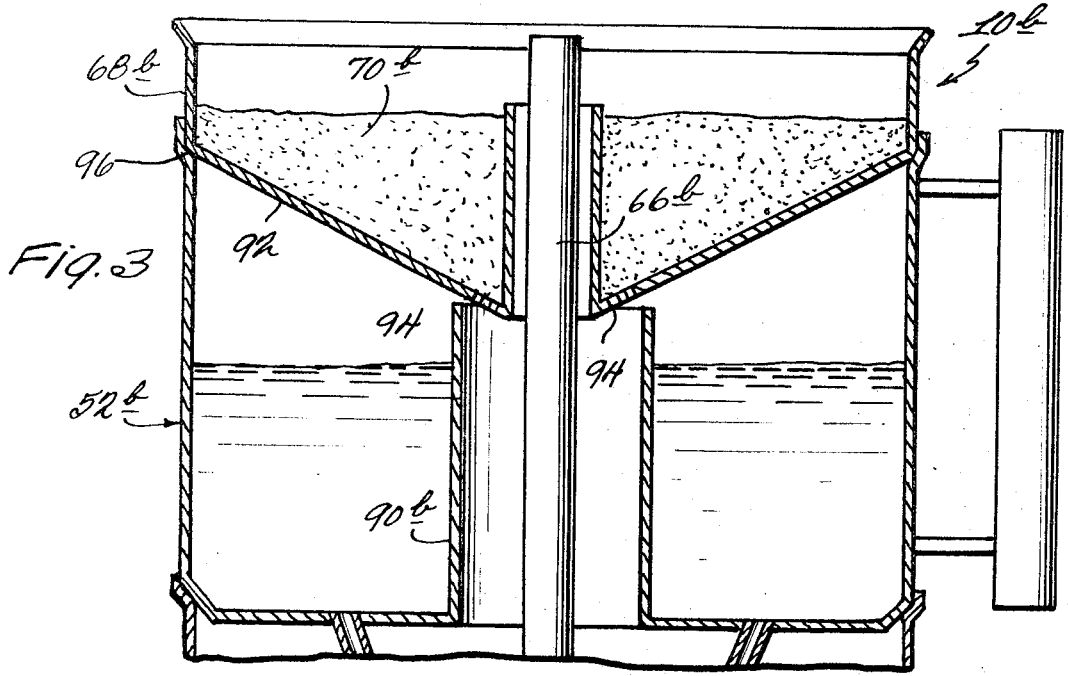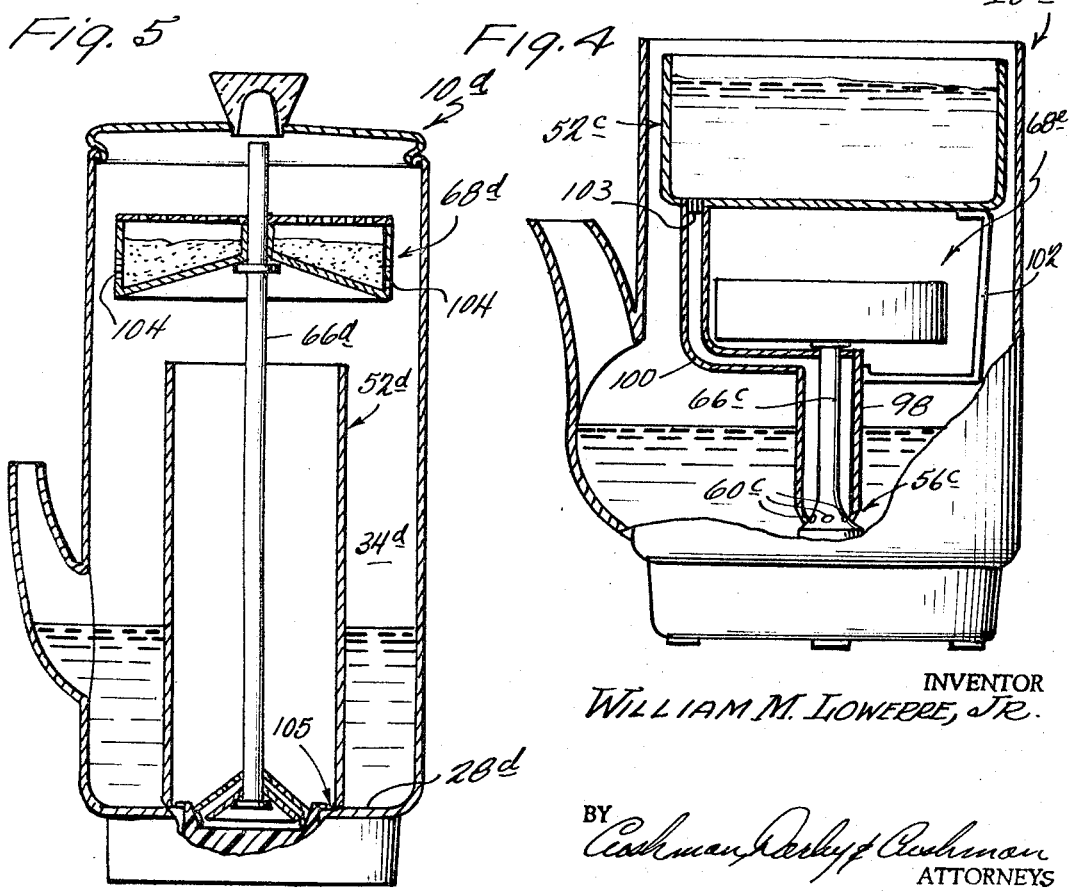

April 30, 1968

W. M. LOWERRE, JR 3,380,374

LIQUID INFUSION DEVICE

Filed Aug. 24, 1966

INVENTOR
WILLIAM M. LOWERRE, JR.

By Cushman, Darby & Cushman
ATTORNEYS

United States Patent Office 3,380,374
Patented Apr. 30, 1968

3,380,374
LIQUID INFUSION DEVICE
William M. Lowerre, Jr., 201 Evergreen St., Apt. 8–3E, Vestal, N.Y. 13850
Continuation-in-part of application Ser. No. 451,100, Apr. 23, 1965. This application Aug. 24, 1966, Ser. No. 574,680
14 Claims. (Cl. 99—281)

ABSTRACT OF THE DISCLOSURE

An automatic drip-type coffee pot or the like comprises a water compartment, percolator pump associated with the water compartment, coffee-basket and brewed coffee compartment which is separate from the water compartment. An electric heating element and thermostat combination is associated with the percolator pump and with the brewed coffee compartment and serves the dual function of vaporizing increments of water in the percolator pump and maintaining the brewed coffee at an elevated temperature.

---

This is a continuation-in-part of application, Ser. No. 451,100, filed Apr. 23, 1965, and now abandoned.

This invention relates to infusion devices for making beverages, such as coffee and tea. In particular, it relates to automatic devices adapted to make a beverage by the drip process in which a heated liquid is passed once through a quantity of infusion material and subsequently stored until used.

Conventional drip-type infusion devices, of which drip coffee makers are the most common example, suffer from several disadvantages, the most important being the amount of time required to make a pot of coffee and the number of manual operations which are required. In the simplest form of drip coffee maker it is necessary to heat the water in a separate pan, manually pour the hot water into the coffee maker and wait for the water to pass through the coffee grounds. In the more sophisticated devices, the operation is more automatic, although not without drawbacks. For example, in operating a conventional vacuum type of drip coffee maker, one must wait for the entire quantity of water to be heated, then wait while the heated water is forced upwardly into an infusion chamber, and then wait for the brewed coffee to pass downwardly through a filter into the lower chamber. These devices are slow in operation and require manual operation to reduce the heat input at the proper time and to adjust the heat input while keeping the brewed coffee hot.

Drip-type coffee makers which make use of a percolator pump to deliver hot water to the coffee grounds are also known. In these devices there is a separate water compartment and the perk principle of percolator type coffee makers is employed to heat and deliver the water to the coffee grounds in increments. The brewed coffee is collected, as it is formed, in a separate storage compartment within the device. None of these devices, however, is adapted to make the coffee in a completely automatic manner including the automatic retention of the brewed coffee at an elevated temperature. Examples of drip-type coffee makers employing the percolator principle may be found in Pons et al. Patent No. 1,115,451, and Unstott, Patent No. 2,046,710.

It is one object of the present invention to provide an electrically-heated, infusion-making device of the drip type which is rapid in operation and which is fully automatic. The device achieves rapid operation by carrying out the heating and drip cycles simultaneously. Fully automatic operation is achieved by an arrangement of parts which maintains the initial water supply in a separate chamber until the device is turned on and which then carries out the simultaneous heating and drip cycles and stores the brewed infusion at a suitable elevated temperature, all without requiring any adjustments by the operator.

It is another object of the present invention to provide a conversion unit capable of converting a conventional percolator type infusion maker into an automatic drip type infusion maker.

According to the principle of the present invention, the above-indicated advantages of rapid and fully automatic operation are achieved with a percolator type pump and pump tube and a thermostatically controlled electric heating device which cooperate with each other and with separate water and infusion storage compartments in a novel manner. The percolator type pump, the pump tube and the thermostatically-controlled heating unit may be, per se, standard pieces of equipment. However, the manner in which these parts are arranged with the water and storage compartments produces an improved device which heretofore has not been suggested. The details of the novel arrangement are clearly shown in the accompanying drawings in which several different embodiments are illustrated and in which:

FIGURE 3 is a vertical sectional view of a third embodiment;

FIGURE 4 is a vertical sectional view of a fourth embodiment; and

FIGURES 5, 6 and 7 are vertical sectional views of fifth, sixth and seventh embodiments, respectively.

Figure 1:
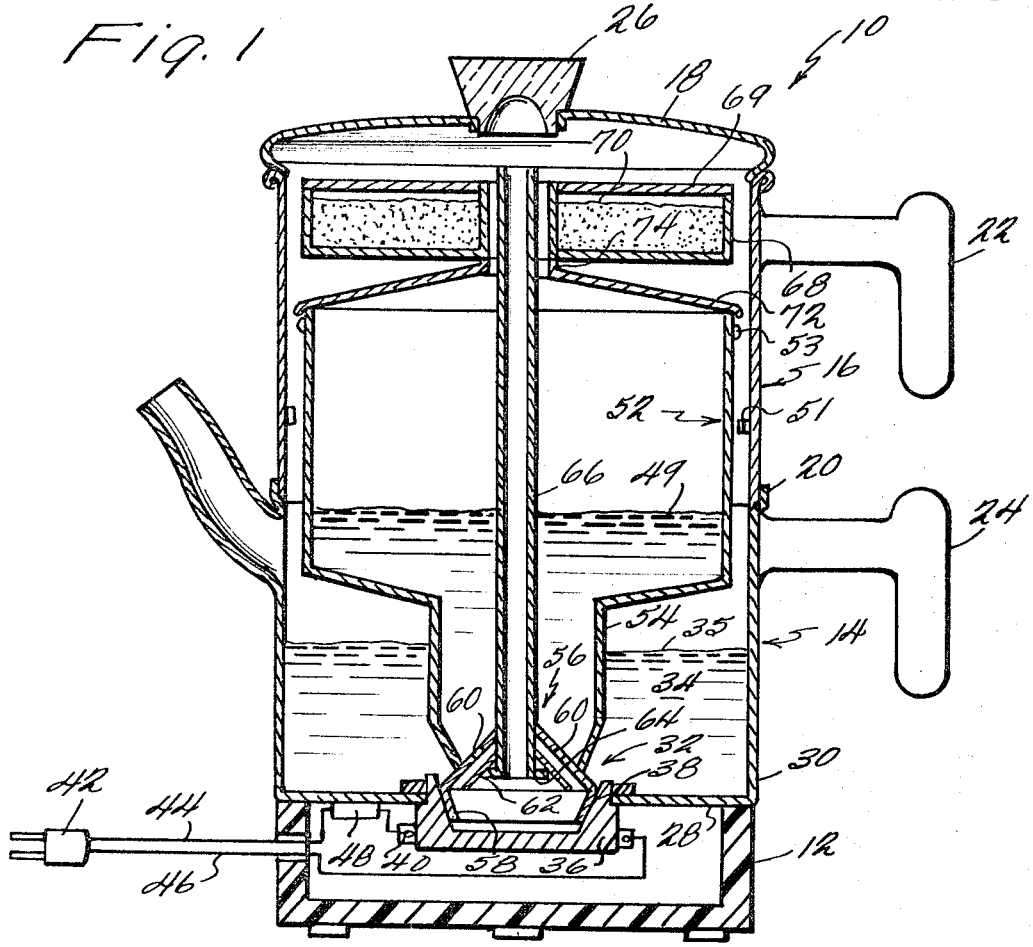
FIGURE 1 is a vertical sectional view of a first embodiment of an automatic coffee maker constructed in accordance with the principles of the present invention.

Referring to FIGURE 1, there is shown a coffee pot 10 which includes a hollow base 12, a lower cylindrical container 14 fixed to the base 12, an upper cylindrical container 16 carried on the lower container 14 and a removable cover 18 closing the upper container 16. The upper container 16 is releasably mounted on the lower container 14 by means of a stepped flange arrangement 20. For ease of manipulation of the parts, the sides of the upper and lower containers are provided with handles 22 and 24. The cover 18 includes a conventional centrally located glass percolator shield 26.

The lower container 14 has a bottom wall 28 which defines with the adjacent side wall 30 and a central percolating well 32, an annularly shaped chamber 34 in which brewed coffee 35 is stored. The percolating well 32 includes a metal cup-shaped member 36 which projects through the bottom wall 28 and which is sealed to the latter as by a ring 38. The element is heated by an electric resistance heater 40 which is located below the bottom wall 28 within the hollow base 12. The heater 40 surrounds the body of the member 36 so that most of the heat input is concentrated in the cup-shaped cavity which thereby defines an area of high heat input. However, some of the heat will be conducted through the member 36 to the bottom wall 28 so that the latter defines an area of low heat input.

Electric current is supplied to the heater 40 by means of a conventional plug 42 and wires 44, 46. The circuit is provided with a control device 48 which includes a thermostat in thermal engagement with the bottom wall 28 at a location radially outwardly of the percolator well 32. When the thermostat is cold, it acts as a closed switch which permits full current flow through the heater 40. When the thermostat senses a predetermined temperature, for example 180° F., it reduces the heat input to the pot 10 as by switching a high resistance into series with the heater 40 or by disconnecting the heater 40 from the line current. In operation, the heater 40 will receive full current when the plug 42 is first inserted into an electrical outlet. The temperature of the brewed coffee in the chamber 34 will gradually increase during operation as a result of the accumulation of the increments of hot brewed coffee passing into the chamber 34 and as a result of heat being conducted from the member 36 through the bottom wall 28 to the brewed coffee.

It will be understood that the construction and arrangement of the percolating well 32, the heater 40 and the thermostatic control device 48 may be varied so long as the automatic pumping function and the subsequent automatic reduction of heat input are retained. For example, the percolating well 32 may be defined by a recess in the bottom wall 28 with the heater 40 attached to the lower surface of the bottom wall, thereby eliminating the member 36. The thermostat of the control device 48 may be in thermal engagement with the member 36 or, if the latter is not employed, in thermal contact with the previously-mentioned recess.

A cylindrical water container 52 is disposed within the upper and lower containers 16, 14 for holding a charge of water 49 from which coffee is to be brewed. The inner surface of the upper container 16 is provided with three circumferentially spaced brackets 51 which center the water container and which cooperate with a bead 53 on the latter when the device is disassembled. A tubular extension 54 of the chamber 52 projects downwardly and terminates at the percolator well 32. A percolator pump 56 is arranged concentrically with the extension 54 and is attached to the lower end thereof in a manner which permits water to pass from the water container 52 into the well 32 but which seals the water container 52 from the brewed coffee chamber 34.

The percolator pump 56 comprises a housing having an open-ended frusto-conical bottom portion 58 which releasably seats on a complementary surface defined by the interior side wall of the percolator well 32. The upper wall of the pump housing is provided with water inlet holes 60 which communicate with the interior of the water container extension 54, and the latter is integrally connected or otherwise permanently sealed to the housing so as to prevent mixing of fresh water with brewed coffee. Inside the pump housing is a generally frusto-conical flap valve 62 which is loosely retained between the housing wall and the flanged end 64 of a vertical pump tube 66. The latter passes upwardly through the pump housing, to which it is secured, and terminates near the upper end of the coffee pot 10. In its illustrated position, the flap valve 62 has dropped away from the holes 60 so that water can pass from the water container 52 into well 32. When steam is generated inside the well 32, the valve 62 will be forced upwardly and block the holes 60. The steam in the well 32 will then pass upwardly into the pump tube 66.

Figure 1A:
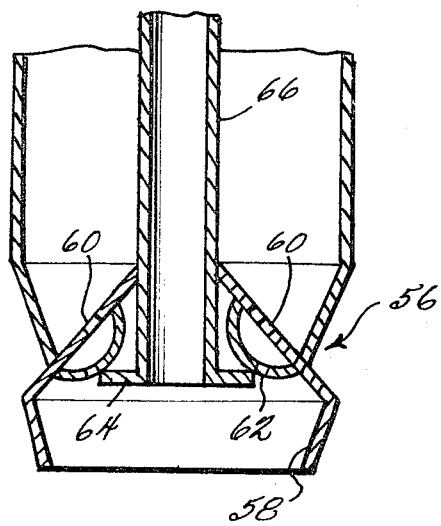
FIGURE 1a is a fragmentary view of part of the device of FIGURE 1.

The flap valve 62 is constructed as a bimetallic thermostatic element which, when cold, assumes a dish-shape so as to bear against the flanged end 64 of the pump tube 66 and against the pump housing in a manner to block the holes 60. In this condition, as shown in FIGURE 1a, the valve 62 serves a thermostatically closed valve. When heated to, say 135° F. or above, the valve assumes the shape shown in FIGURE 1 and operates as described above.

It will be understood that the pump 56 and valve 62 are not restricted to the particular shapes illustrated in the drawing, the only criterion being that the arrangement seal in or over the well and prevent the escape of steam around the edges of the pump housing.

A conventional perforated coffee basket 68 and perforated spreader plate 69 are disposed within the upper container 16 below the upper end of the pump tube 66. In operation, perked water issues from the pump tube 66, splashes down on a quantity of coffee grounds 70 in the basket 68 and passes downwardly through the perforations in the latter in the form of brewed coffee. A removable drip shield 72, which is slightly conical in shape, is fitted over the upper end of the water container 52 and directs the brewed coffee radially outwardly so that it passes down the outside of the water container 52. In the illustrated construction, the coffee basket 68 rests on a collar 74 which forms part of the drip shield 72 so as to be spaced from the latter.

Figure 2:
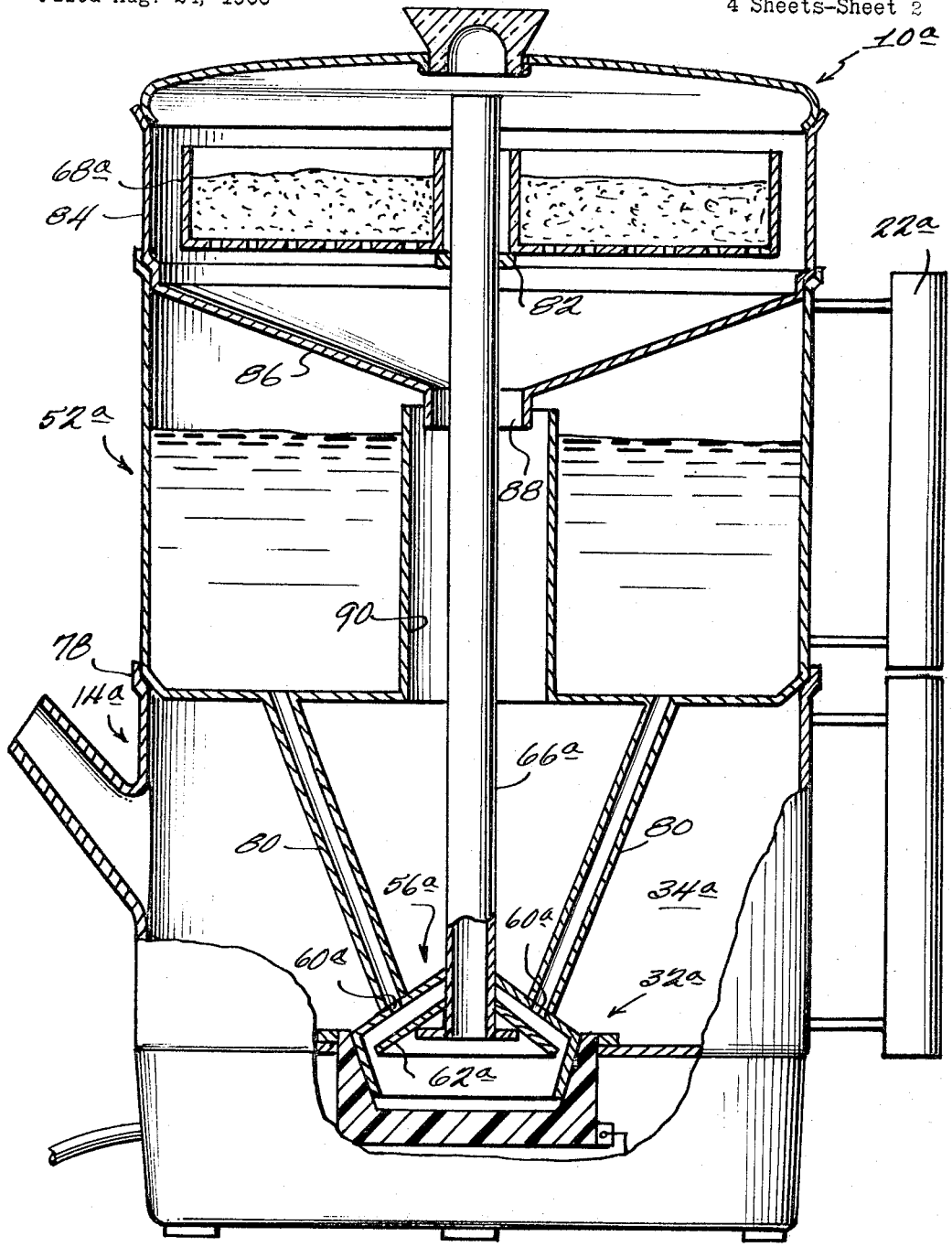
FIGURE 2 is a vertical sectional view of a second embodiment of automatic coffee maker.

FIGURE 2 illustrates a second embodiment in which the outer container 16 of the FIGURE 1 has been eliminated. As shown, an annularly shaped water container 52a is disposed above a lower container 14a, there being provided a stepped flange arrangement 78 for aligning the containers with each other. A handle 22a is connected directly to the side wall of the water container 52a. A percolator pump 56a supports the water container 52a and cooperates with a percolator well 32a and heating circuit in the same manner as described with respect to FIGURE 1. Water from the water container 52a enters holes 60a in the pump housing through one or more tubes 80 and is pumped up a central pump tube 66a to a coffee basket 68a. Surrounding the basket is a container 84 which rests on top of the water container 52a. The bottom of the container 84 is defined by a wall 86 which serves as a drip shield for brewed coffee. A central opening 88 in the bottom wall 86 is aligned with a tubular member 90 which forms the inner wall of the water chamber 52a. The coffee basket 68a may be supported, as shown, by a flange 82 on the pump tube 66a, or it may rest directly on the upper surface of the wall 86.

FIGURE 3 illustrates a third embodiment, similar to the construction of FIGURE 2, in which a brewed coffee drip shield is replaced with a special form of coffee basket 68b. As shown, the basket 68b has an inverted frusto-conical bottom wall 92 which is perforated only near its central portion 94 so that brewed coffee will issue directly above the tubular member 90b. The inner annular wall of the basket 68b may also be perforated if desired. The basket 68b is supported on an inwardly directed flange 96 formed on the upper edge of the water container 52b.

FIGURE 4 illustrates a fourth embodiment in which the water container 52c is disposed above the coffee gasket 68c. As shown, the water container 52c is disposed within the uppermost portion of the pot 10c and is supported in position from the bottom of the pot by means of a central tubular member 98, a water tube 100 and a bracket 102. The lower end of the tubular member 98 is fixed to the housing of a percolator pump 56c at a location radially outwardly of the water inlet holes 60c of the latter. The water tube 100 contains a water-metering orifice 103 which restricts the flow of water so that action of the percolator pump 56c, not gravity, will elevate water through the pump tube 66c. The pump 56c is of the same construction as described previously.

FIGURE 5 illustrates an embodiment of a coffee pot 10d in which a drip shield is eliminated by the use of a special coffee basket 68d having perforations only near its outer edge. As shown, the basket 68d has perforations 104 only in the outer side wall, although the outer portion of the bottom wall may be perforated as well. In either case, the diameter of the basket 68d must be greater than the diameter of the water container 52d, to assure that brewed coffee will flow down on the outside of the latter. The lower end of the water container 52d is provided with an aperture 105, the periphery of which is sealed to the bottom wall 28d at a location radially outwardly of the pump 56d.

Figure 6:
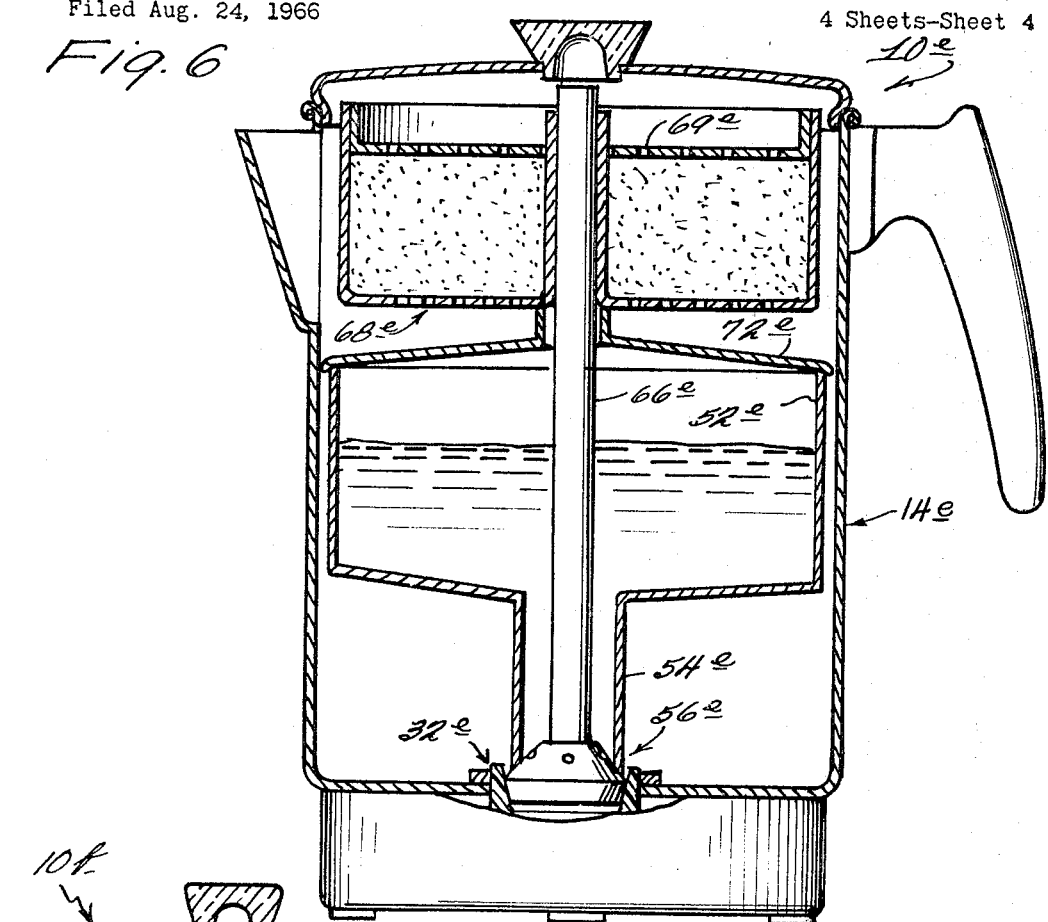

FIGURE 6 illustrates a coffee pot 10e in which a water container assembly may be substituted for the original pump and pump tube of a conventional coffee percolator, thereby converting the device from a percolator to a drip coffee maker. The water container assembly includes a water container 52e, a depending extension 54e, a percolator pump 56e, a pump tube 66e and a drip shield 72e. A coffee basket 68e is conventional except that, preferably, its perforations are quite small so as to prevent the finest of drip-grind coffee from being washed through. Since the water container 52e takes up space within the single outer container 14e of the original pot 10e, the coffee-making capacity of the drip device is less than that of the percolater device. In the illustrated embodiment, the outer container 14e has a volume of somewhat more than eight cups and is therefore suitable for making eight cups of percolator coffee. The same device, when converted, will make up to four cups of drip coffee since the water container 52e of four cups capacity occupies almost one-half the volume of the outer container 14e. A pump 56e and pump tube 66e are associated with the extension 54e in the same manner as in FIGURE 1. The outer container 14e with its well 32e and heating circuit is of typical percolator construction and, as shown, is the same as in FIGURE 1.

Figure 7:
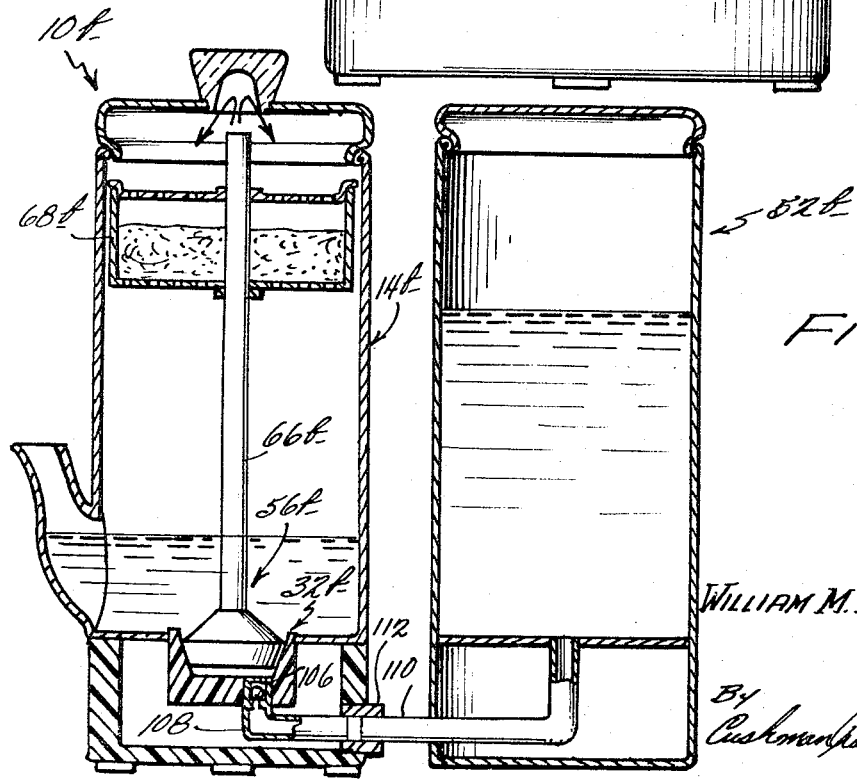

FIGURE 7 illustrates an embodiment in which the water container 52f is located outside the pot 10f. As shown, the pot 10f is constructed of a single container 14f having a conventional coffee basket 68f supported on a flange on a central pump tube 66f. The lower end of the pump tube 66f is secured to a percolator pump 56f which is the same as that shown in FIGURE 1 except that the pump housing has no water inlet holes. Water enters the pump housing through a passage 106 in the bottom of the associated percolator well 32f which is otherwise the same as the well in FIGURE 1. The passage 106 communicates with the water container 52f by means of a tube 108 in the base 12f and a tube 110 extending from the lower end of the water container 52f. A disconnect fixture 112 may be employed between the tubes 108 and 110. To prevent water in the well 32f from returning to the water container 52f a ball check valve is provided in the tube 108.

OPERATION

The overall operation of each of the embodiments is the same in that in each case the device, once supplied with electric current, automatically heats the charge of water and pumps it to the coffee grounds, collects the brewed coffee without recycling it through the grounds, and maintains the brewed coffee at an elevated temperature without boiling it. The pumping action and hot storage are effected in the same manner in each case by means of the pump, pump tube, percolator well and thermostatically controlled electrical heating circuit.

A description of the operation of the FIGURE 1 construction will suffice to explain the principles applicable to all the embodiments. Assuming that the water container 52 has been filled and that the plug 42 has been inserted into an electrical outlet, operation of the FIGURE 1 embodiment is as follows. At startup a high heat input is supplied by the heater 40 to the cup-shaped element 36 of the percolator well 32. When the bimetallic valve 62 becomes hot, it assumes the shape shown in FIGURE 1 and allows water to pass downwardly by gravity through the holes 60 in the pump housing and to rise in the tube 66 to the level of the water in the water container 52. When a portion of the water in the well is heated to its boiling point, steam is formed and passes into the pump where it forces the flap valve up into engagement with the pump housing thereby closing the water inlet holes 60. At the same time, the steam passes up the tube 66 thereby forcing a column of water out the top of the latter. The water impinges on the glass shield 26 and drops on the coffee grounds in the basket 68. Brewed coffee flows out the perforations in the basket 68 on to the drip shield 72 and is deflected radially outwardly so as to pass down the outside of the water container 52.

The increments of brewed coffee collect in the chamber 34 at the bottom of the lower container 14. No mixing of the brewed coffee with the water in the well 32 occurs, because the bottom portion 58 of the pump 56 forms a seal with the well 32. The stored hot coffee which is thus formed is heated to an elevated temperature by heat which is conducted from the cup-shaped element 36 to the bottom wall 28. When the temperature of the stored coffee reaches the actuating temperature of the control device 48, for example 180° F., the latter reduces or interrupts the flow of current to the heater 40. If the coffee cools below 180° upon standing, the thermostat turns on the heater so as to again heat the coffee to the desired temperature. The arrangement and design of the heater 40, the cup-shaped element 36 and the control device 48 are such that all the water from the water container 52 will have been perked by the time the control device 48 operates to reduce the heat input.

The coffee pot 10 of FIGURE 1 may be disassembled for refilling by grasping the handle 22 and lifting the upper container 16 away from the lower container 14. The brackets 51 on the upper container 16 will engage the bead 53 on the water container 52 so that the latter, together with the pump 56 and tube 66, will be raised out of the lower container 14. When the assembly is set on a table surface or the like, the upper container 16 is lowered to expose the upper portion of the water container 52. After the coffee basket 68 and the drip shield 72 have been lifted off the upper end of the tube 66 a measured amount of cold water is placed in the water container 52. The water does not flow out the lower end of the extension 54, because the bimetallic valve 62, being cold, has assumed the shape shown in FIGURE 1a. The drip shield 72 and coffee basket 68 are replaced; coffee grounds 70 are added to the basket, and the entire assembly is replaced on the lower container 14. It will be appreciated that the thermostatic nature of the valve 62 is not critical, because the water container 52 can be filled when in position in the lower container 14. In the latter case, the seal formed between the well 32 and the bottom portion 58 of the pump 56 prevents water from flowing out of the water container 52.

In the FIGURE 2 construction, brewed coffee issuing from the basket 68a is diverted radially inwardly by the drip shield 86 so as to pass downwardly through the tubular member 90 into the storage chamber 34a. Excess perked water, if any, overflows the basket 68a and follows the same path as the brewed coffee. In this construction, water is delivered to the percolator pump 56a through separate tubes 80 rather than through a single large extension 54 as in the FIGURE 1 construction.

In operation of the FIGURE 3 embodiment, brewed coffee is delivered to the upper end of the tubular member 90b by virtue of the special construction of the coffee basket 68b, thereby eliminating the need for a drip shield. Water passing through the coffee grounds 70b is directed toward the center line of the pot 10b by the inclined bottom wall 92 and is discharged through the perforations 94 which are disposed directly above the member 90b.

In the FIGURE 4 embodiment, water from the water container 52c flows slowly through the tubes 100 and 98 due to the pressure of the restriction. This prevents the head developed by the elevation of the water container 52c above the basket 68c from forcing a large amount of cold water up the pump tube 66c. When the device is cold, the valve in the pump 56c automatically prevents water from being forced up the tube 66c.

In the FIGURE 5 embodiment, brewed coffee is discharged only from the outer edge of the coffee basket 68d so that a drip shield is not required.

In the FIGURE 6 embodiment, the water container 52e and its associated parts are designed so as to be interchangeable with the standard percolating pump and pump tube of a conventional electric coffee percolator. To make the conversion it is only necessary to lift the standard pump and pump tube from the container 14e and to insert the water container assembly. A coffee basket 68e is placed on top of the water container assembly after the latter has been inserted in the container 14e. A single coffee basket will suffice for making both drip and perk coffee. Preferably, the basket is provided with relatively small perforations so as to retain the finer grind of coffee which is generally employed for making drip coffee, although a basket with the larger, percolator-type perforations may be employed. The water container assembly, as previously described, includes the water container 52e, extension 54e, percolator pump 56e, pump tube 66e and the drip shield 72e.

In the FIGURE 7 embodiment, the water container 52f is a separate unit disposed outside the coffee pot 10f. During the perking operation, water is delivered to the bottom of the percolator well 32f through the tubes 110 and 108. When perking has been completed, the tube 110 may be disconnected from the tube 108 and the pot 10f employed separately in the usual manner.

The water container and associated pump and pump tube of the arrangements of FIGURES 4, 5 and 7 may be employed as conversion units for existing coffee percolators as described with reference to FIGURE 6. The percolators of FIGURES 5 and 7 would require minor changes which could be easily effected by the manufacturer.

The illustrated infusion devices have been described as coffee-making devices. It will be apparent, however, that the principles of the invention are equally applicable to making tea or any other type of infusion beverage.

While preferred embodiments of the present invention have been described, further modification may be made without departing from the scope of the invention. Therefore, it is to be understood that the details set forth or shown in the drawings are to be interpreted in an illustrative, and not in a limiting sense, except as they appear in the appended claims.

What is claimed is:

1. An automatic infusion making device adapted to heat a charge of water and infuse a mass of material therewith simultaneously without recycling infusion to said mass of material and further adapted to store the infusion separately from the charge of water and to maintain the infusion at elevated temperature, said device comprising: a primary container having a wall defining a chamber; electric heating means associated with said chamber for simultaneously imparting a high heat input to a first area of said chamber and a lesser heat input to a second area of said chamber; thermostatic control means associated with said chamber at a location remote from said area of high heat input for reducing the heat input to said areas in response to a predetermined elevated temperature; perforated basket means above said chamber for holding a mass of material from which the beverage is to be made by infusion with hot water; means for conducting liquid infusion from the bottom of said basket means directly to said chamber at a location adjacent said area of lesser heat input; a water container associated with said primary container above the level of said chamber for holding a mass of water which is to be heated and delivered to said backet means; means for conducting water from said water container to said area of high heat input; means for conducting heated increments of water from said area of high heat input to said basket means, said means including a pump and a pump tube, said tube extending upwardly from said pump and terminating in an open end disposed to deliver pumped fluids to said basket means, said pump having an open lower end which is sealed to said area of high heat input so as to separate said area of high heat input from said area of low heat input and so as to prevent communication between the interior of said pump and said chamber whereby water in said pump contacts said area of high heat input, becomes partially vaporized and passes upwardly through said pump tube and whereby liquid in said chamber is maintained separate from water in said pump and is maintained at a predetermined elevated temperature by heat conduction from said area of lesser heat input.

2. Apparatus as in claim 1 wherein said pump includes a housing having a downwardly facing opening which defines said open end of said pump, the periphery of said opening being in releasable engagement with the wall of said primary container and surrounding said area of high input, wherein said water container includes a chamber of enlarged horizontal cross section, and wherein said means for conducting water from said water container to said area of high heat input includes at least one aperture in said pump housing and a tubular member of lesser cross sectional area than said enlarged chamber placing said hole in communication with said enlarged chamber.

3. Apparatus as in claim 1 wherein said pump includes a housing having a downwardly facing opening which defines said open end of said pump, the periphery of said opening being in releasable engagement with the wall of said primary container and surrounding said area of high heat input, wherein said water container is of lesser horizontal cross sectional area than said primary container and concentrically surrounds said pump tube, said water container being connected at its lower end to said pump housing so as to be supported therefrom, and wherein said means for conducting water from said water container to said area of high heat input includes at least one aperture in said pump housing at a location inside said water container.

4. An infusion making device comprising: a primary container having a bottom wall and an upright side wall which together define a chamber for storing liquid infusion; a percolator well concentrically disposed in said bottom wall and defining an upwardly facing cavity; electric heating means associated with said well; a percolator pump associated with said well, said pump including a housing having a downwardly facing opening disposed concentrically with said cavity, the periphery of said opening releasably engaging said well in sealing relationship; a pump tube extending upwardly from said pump housing; a perforated basket disposed concentrically with the upper end of said pump tube and supported above and in communication with said storage chamber; a water container disposed above the level of said well for retaining a charge of water separate from said storage chamber; and means for conducting water from said water chamber to said cavity in said percolator well.

5. Apparatus as in claim 4 wherein said water container is disposed concentrically around said pump tube at a location intermediate said basket and said storage chamber, said apparatus including a removable drip shield closing the upper end of said water container, said drip shield being tapered upwardly and inwardly so as to deflect liquid infusion radially to the outside of said water container.

6. Apparatus as in claim 4 wherein said water container is disposed concentrically around said pump tube at a location intermediate said basket and said storage chamber and wherein said water container includes a tubular inner wall of substantially greater diameter than said pump tube, said apparatus including a removable drip shield closing the upper end of said water container, said drip shield being tapered downwardly and inwardly and having a central aperture aligned with the space between said pump tube and said tubular inner wall of said water container.

7. Apparatus as in claim 4 wherein said water container is disposed concentrically around said pump tube at a location intermediate said basket and said storage chamber and wherein said water container includes a tubular inner wall of substantially greater diameter than said pump tube, said basket being provided with perforations only near its center at locations above the space between said pump tube and said tubular inner wall of said water container.

8. Apparatus as in claim 4 wherein said water container is disposed concentrically around said pump tube at a location intermediate said basket and said storage chamber, said basket being of greater horizontal cross sectional area than said water container and being provided with perforations only at its outer edge whereby liquid infusion is discharged at locations which are radially outward of said water container.

9. A conversion unit for converting a percolator-type infusion device to a drip-type device, said percolator-type device being of the kind having a primary container defined by a bottom wall and an upright side wall, and having heating means associated therewith, said conversion unit comprising: a percolator pump housing having a downwardly facing opening adapted to cooperate with the heating means and having at least one water inlet aperture; a percolator pump tube secured to and extending upwardly from said housing; a water container surrounding at least a portion of the length of said pump tube and having an open upper end and a lower end portion in communication with said water inlet aperture.

10. Apparatus as in claim 9 including a bimetallic valve member within said pump housing, said valve member assuming when cold a position which blocks said water inlet aperture and assuming when hot a loose position in which it is movable away from said water inlet aperture under the influence of the pressure of a charge of water in said water container.

11. Apparatus as in claim 9 including a removable drip shield covering said open top of said water container.

12. Apparatus as in claim 9 wherein said lower end portion of said water container is defined by a generally vertical tube of lesser cross section than the remainder of said container, said generally vertical tube depending from the approximate vertical midline of said remainder and surrounding said pump tube, the lower end of said generally vertical tube being secured to said pump housing.

13. Apparatus as in claim 9 wherein said lower end portion of said water container is defined by a tube of lesser cross section than the remainder of said container, said tube depending from a peripheral portion of said remainder and having a lower end secured to said pump housing.

14. Apparatus as in claim 4 wherein said water container is disposed outside said primary container and wherein said means for conducting water from said water container to said cavity in said percolator well includes a tube extending from the lower end of said container to said cavity.

References Cited

UNITED STATES PATENTS

| | | | |
|---|---|---|---|
| 1,115,451 | 10/1914 | Pons et al. | 99—313 X |
| 1,581,871 | 4/1926 | Roberts | 99—314 X |
| 1,582,685 | 4/1926 | Pence | 99—313 X |
| 1,843,241 | 2/1932 | Pouget | 99—314 X |
| 1,916,369 | 7/1933 | Harpster | 99—282 |
| 1,943,386 | 1/1934 | Johnson | 99—313 X |
| 2,046,710 | 7/1936 | Umstott | 99—314 |
| 2,222,098 | 11/1940 | Wittels | 99—313 X |
| 2,856,842 | 10/1958 | Schwaneke et al. | 99—284 X |
| 3,093,061 | 6/1963 | Rodwick et al. | 99—281 |
| 3,144,547 | 8/1964 | Price | 99—281 X |

WILLIAM I. PRICE, *Primary Examiner.*